US011113282B2

(12) United States Patent
Chakkappen et al.

(10) Patent No.: US 11,113,282 B2
(45) Date of Patent: Sep. 7, 2021

(54) ONLINE OPTIMIZER STATISTICS MAINTENANCE DURING LOAD

(71) Applicant: Oracle International Corporation, Redwood Shores, CA (US)

(72) Inventors: Sunil P. Chakkappen, Foster City, CA (US); Hong Su, San Carlos, CA (US); Mohamed Zait, San Jose, CA (US); Suratna Budalakoti, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 225 days.

(21) Appl. No.: 16/147,511

(22) Filed: Sep. 28, 2018

(65) Prior Publication Data

US 2019/0102427 A1    Apr. 4, 2019

Related U.S. Application Data

(60) Provisional application No. 62/566,299, filed on Sep. 29, 2017.

(51) Int. Cl.
*G06F 16/00*        (2019.01)
*G06F 16/2453*    (2019.01)
(Continued)

(52) U.S. Cl.
CPC .......... *G06F 16/24542* (2019.01); *G06F 7/14* (2013.01); *G06F 16/2282* (2019.01);
(Continued)

(58) Field of Classification Search
CPC .... G06F 16/2462; G06F 16/00; G06F 16/221; G06F 16/2282; G06F 16/2365;
(Continued)

(56) References Cited

U.S. PATENT DOCUMENTS 7,849,032 B1   12/2010  Campos et al.
9,372,889 B1 *  6/2016  Jakobsson ......... G06F 16/24542
(Continued)

OTHER PUBLICATIONS

PostgreSQL 9.0, "Analyze", https://www.postgresql.org/docs/9.0/sql-analyze.html, last viewed on Jun. 29, 2020, 2 pages.
(Continued)

*Primary Examiner* — Shew Fen Lin
(74) *Attorney, Agent, or Firm* — Hickman Becker Bingham Ledesma LLP

(57) ABSTRACT

Techniques are provided for merging (a) statistics associated with data added to a table in a bulk load operation with (b) statistics associated with data that existed in the table before the bulk load operation. The statistics associated with the bulk load data are generated on-the-fly during the bulk load, and are merged with the pre-existing statistics as part of the same transaction that is used to perform the bulk load operation. Consequently, execution plans for queries that are assigned snapshot times after the commit time of the bulk load transaction will be selected based on the new statistics, while execution plans for queries that are assigned snapshot times before the commit time of the bulk load transaction will be selected based on the pre-existing statistics.

21 Claims, 3 Drawing Sheets

(51) Int. Cl.
  *G06F 7/14* (2006.01)
  *G06F 16/22* (2019.01)
  *G06F 16/23* (2019.01)
  *G06F 16/951* (2019.01)
  *G06F 16/2458* (2019.01)

(52) U.S. Cl.
  CPC ...... *G06F 16/2365* (2019.01); *G06F 16/2386* (2019.01); *G06F 16/2462* (2019.01); *G06F 16/24532* (2019.01); *G06F 16/951* (2019.01)

(58) Field of Classification Search
  CPC ........... G06F 16/2386; G06F 16/24532; G06F 16/24542; G06F 16/951; G06F 7/14; G06N 20/00; G06N 7/005
  See application file for complete search history.

(56) References Cited

U.S. PATENT DOCUMENTS

| | | | |
|---|---|---|---|
| 9,798,772 B2 | 10/2017 | Wu et al. | |
| 10,073,885 B2 | 9/2018 | Das et al. | |
| 2008/0120275 A1* | 5/2008 | Cruanes | G06F 16/2453 |
| 2009/0216709 A1* | 8/2009 | Cheng | G06F 16/2453 |
| 2014/0095472 A1* | 4/2014 | Lee | G06F 16/24542 |
| | | | 707/714 |
| 2016/0299949 A1* | 10/2016 | Konik | G06F 16/23 |
| 2017/0031967 A1 | 2/2017 | Chavan et al. | |
| 2018/0107701 A1* | 4/2018 | Boehme | G06F 16/2358 |

OTHER PUBLICATIONS

Oracle8i interMedia Text Reference Release 2 (8.1.6), "Optimizing Queries with Statistics", https://docs.oracle.com/cd/A87860_01/doc/inter.817/a77063/aoptim2, last viewed on Jun. 29, 2020, 3 pages.
Oracle® Database Performance Tuning Guide, "13 Managing Optimizer Statistics", https://docs.oracle.com/cd/E25054_01/server.1111/e16638/stats, last viewed on Jun. 29, 2020, 30 pages.
Oracle, "Database Performance Tuning Guide", 13 Managing Optimizer Statistics, https://docs.oracle.com/cd/B28359_01/server.111/b28274/stats.htm#PFGRF003, last viewed on Jun. 29, 2020, 27 pages.
Oracle Help Center, "Database Performance Tuning Guide", Oracle Database Online Documentation Release 1 (11.1), https://docs.oracle.com/cd/B28359_01/server.111/b28274/stats.htm, dated Jun. 29, 2020, 2 pgs.
MySQL, "8.3.7 InnoDB and MyISAM Index Statistics Collection", https://dev.mysql.com/doc/refman/5.7/en/index-statistics, last viewed on Jun. 29, 2020, 3 pages.
My SQL, "14.8.11.1 Configuring Persistent Optimizer Statistics Parameters", ;https://dev.mysql.com/doc/refman/5.6/en/innodb-persistent-stats.html, last viewed on Jun. 29, 2020, 11 pages.
My SQL, "13.7.2.1 Analyze Table Statement", https://dev.mysql.com/doc/refman/5.6/en/analyze-table.html, last viewed on Jun. 29, 2020, 3 pages.
Microsoft, "Update Statistics", https://docs.microsoft.com/en-us/sql/t-sql/statements/update-statistics-transact-sql?view=sql-server-ver15, last viewed on Jun. 29, 2020, 10 pages.
Kabra et al., "Efficient Mid-Query Re-Optimization of Sub-Optimal Query Execution Plans", AMC, dated 1998, 12 pages.
IBM MQ, "Analyze Command", IBM Insights, www.ibm.com/support/knowledgecenter/SSPT3X_4.2.0/com.ibm.swg.im.infosphere.biginsights.commsql.doc/doc/bsql_analyze, last viewed on Jun. 29, 2020, 9 pgs.
IBM Community Home, "Where am I", https://community.ibm.com/community/user/legacy?lang=en, last viewed on Jun. 29, 2020, 4 pages.
Heule et al., "HyperLogLog in Practice: Algorithmic Engineering of a State of the Cardinality Estimation Algorithm", EDBT/ICDT '13 Mar. 18-22, 2013, Genoa, Italy, 10 pages.
Flajolet et al., "HyperLogLog: the analysis of a near-optimal cardinality estimation algorithm", dated 2007 Discrete Mathematics and Theoretical Computer Science (DMTCS), 21 pages.

\* cited by examiner

ONLINE OPTIMIZER STATISTICS MAINTENANCE DURING LOAD

CROSS-REFERENCE TO RELATED APPLICATIONS; BENEFIT CLAIM

This application claims the benefit of Provisional Appln. 62/566,299, filed Sep. 29, 2017 the entire contents of which is hereby incorporated by reference as if fully set forth herein, under 35 U.S.C. § 119(e).

FIELD OF THE INVENTION

The present invention relates to improving query execution by improving accuracy of statistics used for execution plan selection and, more specifically, to online optimizer statistics maintenance during bulk loads.

BACKGROUND

Often, a database system must choose between several possible execution plans for a particular query. Each execution plan for the query produces the same results, but produces those results in different ways. For example, one execution plan may retrieve certain data from disk, while another execution plan may retrieve the same data from an in-memory structure. In addition, the secondary access mechanisms, such as indexes and hash tables, that are employed to execute the query may differ from execution plan to execution plan.

While all execution plans for a query produce correct results, some execution plans will perform much better than others. Consequently, the ability to select the best execution plan for any given query can significantly improve performance of the database system, in terms of speed, resource usage, or both. Thus, it is critical for database systems to be able to accurately predict which execution plan, from a variety of available execution plans for a given query, will be most performant at the time the query is to be executed.

Database systems frequently maintain statistics about the data stored in the various tables that are managed by the database systems. Such statistics are a subset of the metadata that the database system maintains for the tables that it manages. Database servers store such statistics for tables in data dictionaries, along with the other metadata associated with the tables.

The prediction of which execution plan will perform best often hinges on the accuracy of those statistics. Many commercial databases provide APIs to gather statistics, and recommend gathering statistics using the API when there is a significant change in the underlying data. For example, to avoid having the statistics for a particular table from becoming too stale, the API may be called on a periodic basis. In response to the call, the old statistics for the table are discarded and a new set of statistics are generated based on the current contents of the table. If the statistics are not maintained up-to-date in a timely manner, use of the stale statistics may lead to the selection of less-performant execution plans, and selection of less-performant execution plans can severely reduce the performance of the database system.

To regenerate statistics for tables, some database systems provide automated tasks that run in a predefined window. Such automated tasks find tables that have stale statistics and gather statistics based on the current contents of the tables. Such automated tasks typically scan the entire tables for gathering statistics about them. Such full table scans can be expensive and use a large amount of system resources.

Further, even in systems that automate such tasks, queries that are issued before the statistics are gathered and refreshed may be executed using less-performant plans that are based on the stale statistics.

Whether statistics are generated in response to explicit API calls or by automated tasks, it is not desirable to regenerate the statistics for a table too frequently, because regenerating the statistics for large tables may consume a large amount of computer resources. Further, the amount of resources thus consumed is independent of the degree to which the data changed since the last statistics generation operation, since the entire set of statistics for each table is regenerated from scratch. That is, for a table with a million rows, regenerating statistics after three rows have been added to the table has approximately the same computational cost as regenerating statistics after a thousand rows have been added to the table.

One type of database event that can render existing statistics obsolete is a "bulk load" operation. In a bulk load operation, large numbers of new rows may be added to an existing table. The data in the new rows may differ significantly from the data in the rows that previously existed in table, so the statistics that reflect those previously-existing rows may be highly inaccurate relative to all of the data that exists in the table after the bulk load operation. For example, one statistic that is often highly relevant to execution plan selection is the number of distinct values within a particular column. Prior to a bulk load, a column may have only a few distinct values. Consequently, an execution plan that works well when columns have few distinct values may be selected to process a query. However, after a bulk load, that same column may have hundreds of distinct values. Under these circumstances, selecting that same execution plan may result in poor performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for merging (a) statistics associated with data added to a table in a bulk load operation with (b) statistics associated with data that existed in the table before the bulk load operation. In one embodiment, the statistics associated with the bulk load data are generated on-the-fly during the bulk load, and are merged with the pre-existing statistics as part of the same transaction that is used to perform the bulk load operation. Consequently, execution plans for queries that are assigned snapshot times after the commit time of the bulk load transaction will be selected based on the new statistics, while execution plans for queries that are assigned snapshot times before the commit time of the bulk load transaction will be selected based on the pre-existing statistics.

Functional Overview

Figure 1:
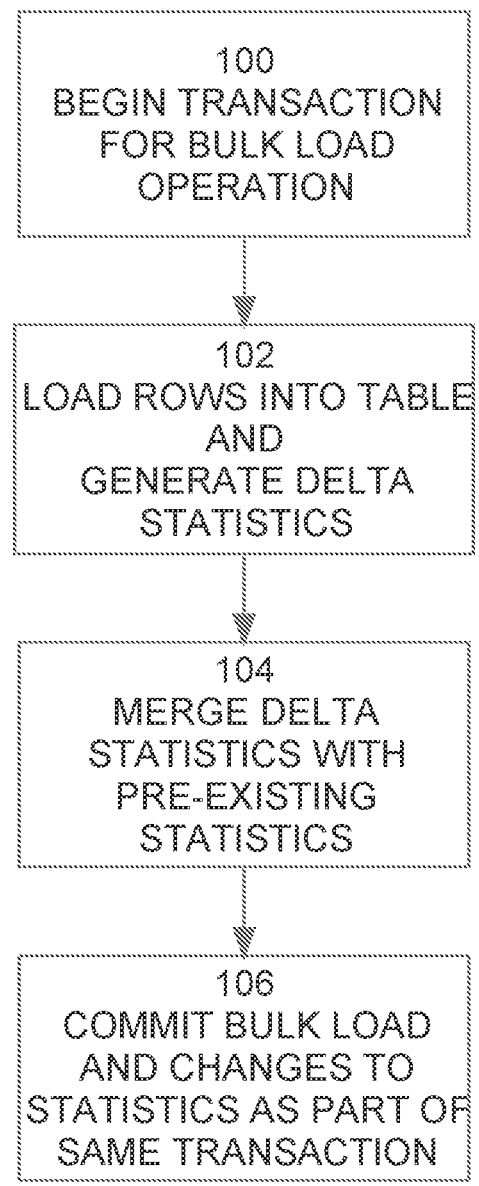
FIG. 1 is a flowchart illustrating steps for incrementally maintaining statistics during a bulk load operation, according to an embodiment.
Figure 2:
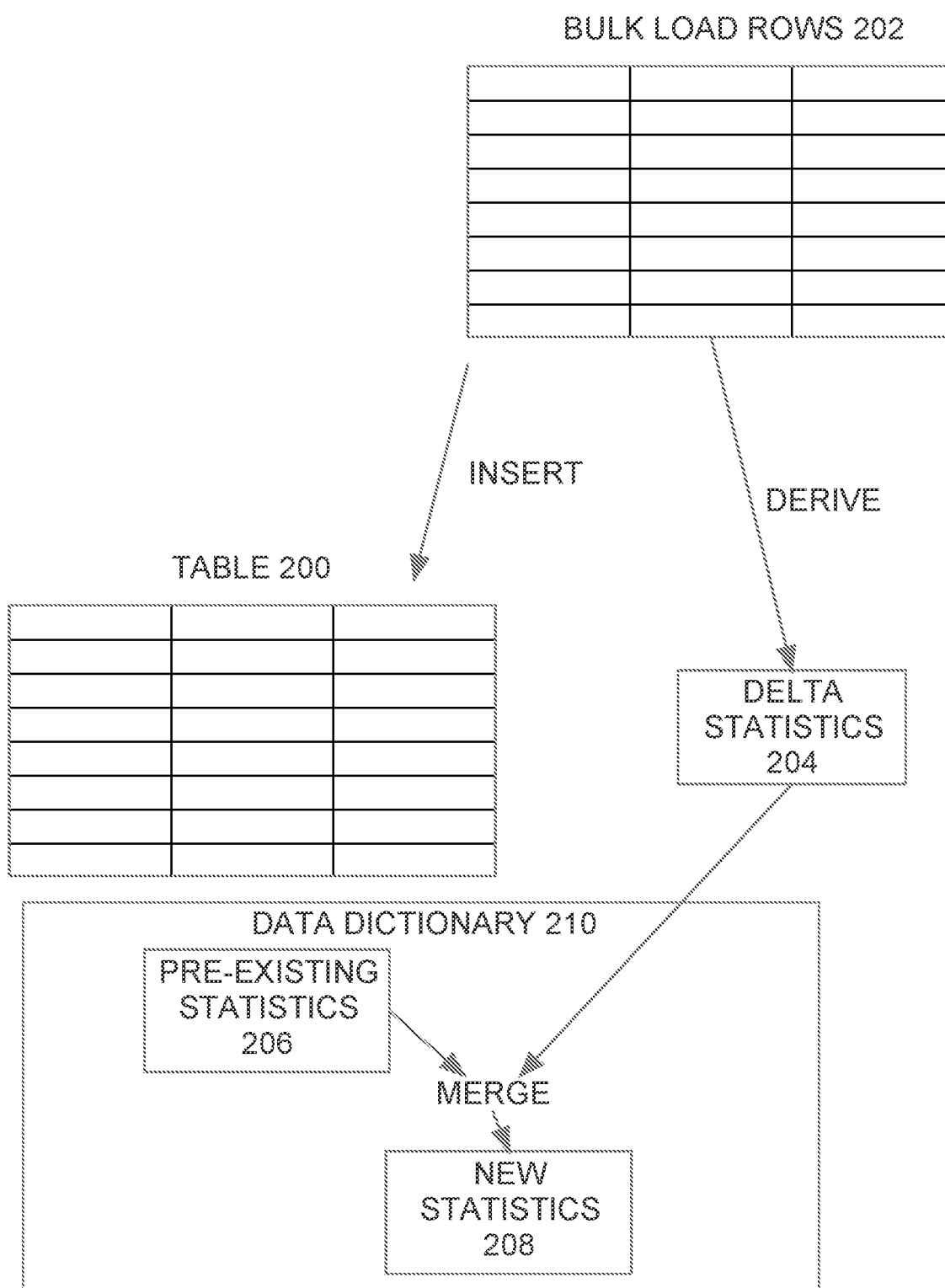
FIG. 2 is a block diagram of a system in which statistics for a table are maintained incrementally during a bulk load operation, according to an embodiment.

FIG. 1 is a flowchart illustrating the high-level steps for performing an incremental update to the statistics associated with a table in response to a bulk load operation. FIG. 2 is a block diagram of a system in which statistics for a table 200 are maintained incrementally during a bulk load operation, according to an embodiment. Prior to the bulk load operation, pre-existing statistics 206 for the table 200 exist in the data dictionary 210 of the database to which table 200 belongs. Referring to FIGS. 1 and 2, at step 100 a transaction is initiated to perform the bulk load operation.

At step 102, two operations occur in parallel: (a) the rows that are part of the bulk load operation (rows 202) are loaded into the table (200), and (b) delta statistics (204) are generated based on values from the rows that are being loaded. How the delta statistics 204 are generated varies based on the statistics in question, as shall be described in greater detail hereafter. If the bulk load is performed in parallel, the generation of the delta statistics 204 are also performed in parallel.

At step 104, the delta statistics 204 are merged with the pre-existing statistics 206 to produce a new set of up-to-date statistics 208. How the delta statistics 204 are merged with pre-existing statistics 206 also varies based on the statistics in question, as shall be described in greater detail hereafter.

At step 106, the bulk load changes and the statistics updates are committed as part of the same transaction. Because the bulk load changes and the statistics updates are committed as part of the same transaction, any query that is assigned a snapshot time after the commit time of the transaction will see both the new rows and the new statistics. Queries that are assigned snapshot times before the commit time of the transaction will see neither the new statistics nor the new rows. Thus, in both cases, the query execution plan for each query will be selected by the database server based on statistics that are accurate relative to the data that will be visible to the query.

Maintaining and Merging Basic Statistics

Generating delta statistics and merging the delta statistics with pre-existing statistics is relatively straightforward for many types of statistics. For example, one statistic that may be maintained for a column of a table is the minimum and/or maximum value currently stored in that column. In the case of the minimum value, generating the delta minimum merely involves keeping track of the lowest value that is stored in that column during the bulk load. Once the bulk load is completed, merging the delta minimum with the pre-existing minimum simply involves setting the new minimum to the lesser of the delta minimum and the pre-existing minimum. Similarly, merging the delta maximum for a column with the pre-existing maximum for the column simply involves setting the new maximum to the greater of the delta maximum and the pre-existing maximum.

Maintaining and merging delta statistics for count and sum aggregate operations are also relatively straightforward. For example, the delta count may be generated by counting the rows added during the bulk operation. The delta count may be merged with the pre-existing count simply by adding the delta count to the pre-existing count.

With respect to generating a delta sum for a column, as each row is inserted during the bulk load, the value in that column for that row may be added to a running total. Thus, at the end of the bulk load, the running total will equal the sum of all values added to that column in the bulk load. That running total is the delta sum, which is added to the pre-existing sum value for that column to produce a new sum statistic for that column.

Maintaining and Merging Distinct Value Statistics

The performance of execution plans often hinges on the number of distinct values in a column. However, the number of distinct values in a column after a bulk load cannot be derived simply by adding the number of distinct values the column had before the bulk load with the number of distinct values that are in the column for the rows that are added by the bulk load, because some of the distinct values in the rows that are added by the bulk load may already have been in the table prior to the bulk load.

In one embodiment, the metadata maintained for a table includes a synopsis from which the number of distinct values of a column of the table may be determined. As used herein, the term "synopsis" means a data structure that summarizes a table, or a portion of a table, in such a way that allows estimation of what is in the portion of the table. According to one embodiment, techniques are provided for merging a "pre-existing synopsis" of the table with a "delta synopsis" that is generated on the fly for the rows of the bulk load as those rows are added to the table. Any one of a variety of techniques may be used to merge the delta synopsis with the pre-existing synopsis. One technique for merging synopses is described, for example, in U.S. Pat. No. 7,603,339, entitled "Merging synopses to determine number of distinct values in large databases", the entire contents of which are incorporated herein by reference.

The merging of the two synopsis is performed as part of the same transaction that is used to perform the bulk load operation. The "new synopsis" produced by merging the pre-existing synopsis with the new synopsis contains the information from which the number of distinct values of a column may be derived. Because the new synopsis is created within the same transaction that performs the bulk load, any query that sees the post-bulk-load table will be processed based on the accurate distinct value statistics for the post-bulk-load table, as reflected in the new synopsis. The new synopsis is then stored on disk for merging with delta synopsis crated for future load operations. In this manner, the synopses are incrementally updated as new bulk load operations are performed.

Maintaining and Merging Histogram Statistics

According to one embodiment, histograms associated with a table are incrementally updated based on a bulk load operation by (a) creating a "delta sample" by sampling the rows that are added to the table during the bulk load operation, (b) creating a "delta histogram" based on the values in the rows of the delta sample, and (b) merging the delta histogram with the appropriate pre-existing histogram. According to one embodiment, the delta sample is generated on-the-fly as rows are added to the table during the bulk load operation, in parallel with the bulk load operation.

Various sampling techniques may be used to determine which rows from the bulk load are included in the delta sample. In one embodiment, reservoir sampling is used to select the rows. Reservoir sampling is described in detail at en.wikipedia.org/wiki/Reservoir_sampling, the contents of which are incorporated herein by this reference.

Unfortunately, reservoir sampling uses a random number generator, which can be expensive. Therefore, according to one embodiment, when a table has several columns for which a sample needs to be created, random numbers are generate or only one column, and those same random numbers are reused for other columns.

As mentioned above, after creating the delta sample, a delta histogram is generated based on the values in the rows of the delta sample. The delta histogram is then merged with the pre-existing histogram to produce an up-to-date histogram that accurately reflects the post-load state of the table. Any one of a variety of techniques may be used to merge the delta histogram with the pre-existing histogram. One technique for merging histograms is described, for example, in U.S. Pat. No. 8,392,406, entitled "Determining a height-balanced histogram incrementally", the entire contents of which are incorporated herein by reference. The merging of the histograms is performed as part of the same transaction as the bulk load operation, so that any query that would see the post-load state of the table will be processed based on the up-to-date version of the histogram.

Sampling in Parallel

If the data is loaded in parallel, the sampling is also performed in parallel. According to one embodiment, a sample is created in each of the parallel process and the per-process samples are merged at the end of the load. For example, assume that the database server is to generate a reservoir sample of N values of a column of a table. Each of the parallel process can load rows at a different rate, and the number of values for a column loaded in each process can be different from each other. According to one embodiment, the following steps are performed to get a reservoir sample of N values during a parallelized load operation:

Each parallel process maintains reservoir sample of N values

At the end of the load, each parallel process sends the number of values loaded to the coordinator, and the coordinator computes the total number of values loaded in all parallel processes.

The total is then communicated from the coordinator to each of the processes.

Each parallel process then computes the percentage of the sample that needs to be sent to the coordinator in such a way that the coordinator will see sample of N values.

The percentage for each parallel process is computed based on (a) the total number of values from all parallel processes, (b) values loaded in the parallel process, and (c) N. Each percentage is computed such that the values send from each parallel process is proportional to the values loaded in the process.

After the process-specific percentages are computed, each parallel process will take a new sample from the reservoir sample of N values based on the percentage computed. (The new sample may be taken, for example, using Bernoulli sampling)

Coordinator merges the samples (simple union all of all values) that were received from parallel processes to create the final sample.

Session-Specific Statistics

In some cases, statistics are maintained on a per-session basis. For example, all sessions may be able to access a "global temporary table", but what the global temporary table contains may be specific to each session. Consequently, any statistics maintained for such a table will also be session-specific.

According to one embodiment, the techniques described above may be used to incrementally maintain session-specific statistics in the same manner as session-independent statistics. For example, in response to a bulk load of the global temporary table in session X, the statistics maintained in session X for the global temporary table may be incrementally updated as part of the same transaction in which the bulk load is performed. Similarly, in response to a bulk load of the global temporary table in session Y, the statistics maintained in session Y for the global temporary table may be incrementally updated as part of the same transaction in which the bulk load is performed. In these cases, the different sessions will have different statistics for the same table, but those statistics will accurately reflect the contents of the table, for each session, at the end of the bulk load in each session.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
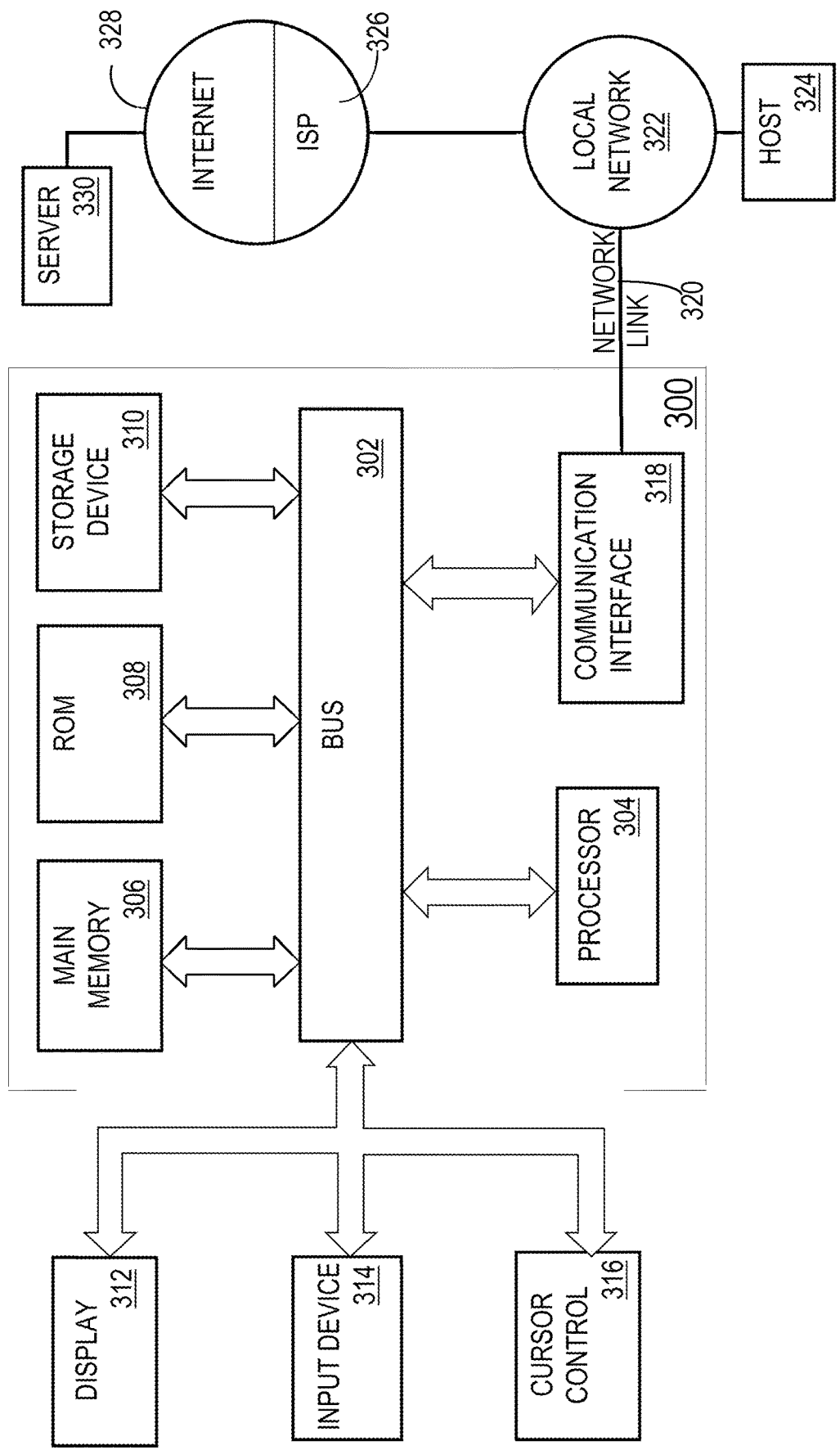
FIG. 3 is a block diagram of a computer system upon which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    initiating, by a database server that manages a database, a transaction to perform a bulk load operation to insert a plurality of rows into a table that resides in the database;
    as part of the transaction that performs the bulk load operation:
        inserting the plurality of rows into the table;
        generating a set of delta statistics based on data in the plurality of rows; and
        merging the set of delta statistics with pre-existing committed statistics for the table to create new statistics for the table;
    after successful completion of the transaction:
        committing the transaction, wherein committing the transaction includes:
            committing the new statistics thereby creating new committed statistics, and
            assigning the transaction a particular commit time;
        receiving a plurality of queries, at the database server, that read data from the table;
        wherein each query of the plurality of queries has a respective snapshot time that dictates which version of the table is used to answer the query;
        comparing the particular commit time with snapshot times of each query of the plurality of queries, to determine whether the new committed statistics or the pre-existing committed statistics should be used for selecting execution plans for the query;
        for queries, of the plurality of queries, that are assigned snapshot times after the particular commit time, selecting execution plans based on the new committed statistics; and
        for queries, of the plurality of queries, that are assigned snapshot times before the particular commit time, selecting execution plans based on the pre-existing committed statistics;
    wherein the method is performed by one or more computing devices.

2. The method of claim 1 wherein the pre-existing committed statistics, the set of delta statistics and the new committed statistics include at least one of:
    a maximum value for a column of the table;
    a minimum value for a column of the table; or
    a sum of all values in a column of the table.

3. The method of claim 1 wherein the pre-existing committed statistics, the set of delta statistics and the new committed statistics include at least one of:
    a synopsis from which a count of distinct values for a column of the table may be derived; or
    a histogram.

4. The method of claim 3 wherein:
    the pre-existing committed statistics, the set of delta statistics and the new committed statistics include a synopsis from which a count of distinct values for a column of the table may be derived;
    generating the set of delta statistics based on data in the plurality of rows includes generating a delta synopsis based on data in the plurality of rows; and
    merging the set of delta statistics with the pre-existing committed statistics includes merging the delta synopsis with a pre-existing synopsis for the table.

5. The method of claim 3 wherein:
    the pre-existing committed statistics, the set of delta statistics and the new committed statistics include a histogram;
    generating the set of delta statistics based on data in the plurality of rows includes generating a delta histogram based on data in the plurality of rows; and
    merging the set of delta statistics with the pre-existing committed statistics includes merging the delta histogram with a pre-existing histogram for the table.

6. The method of claim 5 wherein generating a delta histogram includes:
    creating a delta sample by sampling the plurality of rows; and
    generating the delta histogram based on the delta sample.

7. The method of claim 6 wherein creating the delta sample is performed by reservoir sampling the plurality of rows as the plurality of rows are inserted into the table during the bulk load operation.

8. The method of claim 7 wherein:
    the bulk load operation is performed by a plurality of parallel processes; and
    reservoir sampling the plurality of rows is performed in parallel by the plurality of parallel processes during the bulk load operation.

9. The method of claim 8 wherein reservoir sampling the plurality of rows in parallel comprises obtaining a reservoir sample of N values by:
    causing each parallel process of the plurality of parallel processes to obtain a process-specific sample;
    causing each parallel process of the plurality of parallel processes to report to a coordinator a process-specific load-number that reflects how many rows were loaded by the respective parallel process;

causing the coordinator to generate a total-loaded number by summing together each process-specific load-number received from each parallel process of the plurality of parallel processes;

causing the coordinator to provide the total-loaded number to each parallel process of the plurality of parallel processes;

causing each parallel process of the plurality of parallel processes to determine a process-specific percentage based on the total-loaded number and the process-specific load-number of the respective parallel process;

causing each parallel process of the plurality of parallel processes to obtain a process-specific subsample, of the process-specific sample, based on the process-specific percentage determined for the respective parallel process; and generating the reservoir sample of N values by merging together each process-specific subsample determined by each parallel process of the plurality of parallel processes.

10. The method of claim 9 wherein causing each parallel process of the plurality of parallel processes to obtain a process-specific sample comprises causing each parallel process of the plurality of parallel processes to obtain a process-specific sample of N values.

11. The method of claim 1 wherein the pre-existing committed statistics, the set of delta statistics and the new committed statistics include at least one set of session-specific statistics.

12. One or more non-transitory computer-readable media storing instructions which, when executed by one or more computing devices, cause:

initiating, by a database server that manages a database, a transaction to perform a bulk load operation to insert a plurality of rows into a table that resides in the database;

as part of the transaction that performs the bulk load operation:
  inserting the plurality of rows into the table;
  generating a set of delta statistics based on data in the plurality of rows; and
  merging the set of delta statistics with pre-existing committed statistics for the table to create new statistics for the table;

after successful completion of the transaction:
  committing the transaction, wherein committing the transaction includes:
    committing the new statistics thereby creating new committed statistics, and
    assigning the transaction a particular commit time;
  receiving a plurality of queries, at the database server, that read data from the table;
  wherein each query of the plurality of queries has a respective snapshot time that dictates which version of the table is used to answer the query;
  comparing the particular commit time with snapshot times of each query of the plurality of queries, to determine whether the new committed statistics or the pre-existing committed statistics should be used for selecting execution plans for the query;
  for queries, of the plurality of queries, that are assigned snapshot times after the particular commit time, selecting execution plans based on the new committed statistics; and
  for queries, of the plurality of queries, that are assigned snapshot times before the particular commit time, selecting execution plans based on the pre-existing committed statistics.

13. The one or more non-transitory computer-readable media of claim 12, wherein the pre-existing committed statistics, the set of delta statistics and the new committed statistics include at least one of:
  a maximum value for a column of the table;
  a minimum value for a column of the table; or
  a sum of all values in a column of the table.

14. The one or more non-transitory computer-readable media of claim 12, wherein the pre-existing committed statistics, the set of delta statistics and the new committed statistics include at least one of:
  a synopsis from which a count of distinct values for a column of the table may be derived; or
  a histogram.

15. The one or more non-transitory computer-readable media of claim 14, wherein:
  the pre-existing committed statistics, the set of delta statistics and the new committed statistics include a synopsis from which a count of distinct values for a column of the table may be derived;
  generating the set of delta statistics based on data in the plurality of rows includes generating a delta synopsis based on data in the plurality of rows; and
  merging the set of delta statistics with the pre-existing committed statistics includes merging the delta synopsis with a pre-existing synopsis for the table.

16. The one or more non-transitory computer-readable media of claim 14, wherein:
  the pre-existing committed statistics, the set of delta statistics and the new committed statistics include a histogram;
  generating the set of delta statistics based on data in the plurality of rows includes generating a delta histogram based on data in the plurality of rows; and
  merging the set of delta statistics with the pre-existing committed statistics includes merging the delta histogram with a pre-existing histogram for the table.

17. The one or more non-transitory computer-readable media of claim 16
wherein generating a delta histogram includes:
  creating a delta sample by sampling the plurality of rows; and
  generating the delta histogram based on the delta sample.

18. The one or more non-transitory computer-readable media of claim 17 wherein creating the delta sample is performed by reservoir sampling the plurality of rows as the plurality of rows are inserted into the table during the bulk load operation.

19. The one or more non-transitory computer-readable media of claim 18, wherein:
  the bulk load operation is performed by a plurality of parallel processes; and
  reservoir sampling the plurality of rows is performed in parallel by the plurality of parallel processes during the bulk load operation.

20. The one or more non-transitory computer-readable media of claim 19, wherein reservoir sampling the plurality of rows in parallel comprises obtaining a reservoir sample of N values by:
  causing each parallel process of the plurality of parallel processes to obtain a process-specific sample;
  causing each parallel process of the plurality of parallel processes to report to a coordinator a process-specific load-number that reflects how many rows were loaded by the respective parallel process;

causing the coordinator to generate a total-loaded number by summing together each process-specific load-number received from each parallel process of the plurality of parallel processes;

causing the coordinator to provide the total-loaded number to each parallel process of the plurality of parallel processes;

causing each parallel process of the plurality of parallel processes to determine a process-specific percentage based on the total-loaded number and the process-specific load-number of the respective parallel process;

causing each parallel process of the plurality of parallel processes to obtain a process-specific subsample, of the process-specific sample, based on the process-specific percentage determined for the respective parallel process; and generating the reservoir sample of N values by merging together each process-specific subsample determined by each parallel process of the plurality of parallel processes.

21. The one or more non-transitory computer-readable media of claim 20 wherein causing each parallel process of the plurality of parallel processes to obtain a process-specific sample comprises causing each parallel process of the plurality of parallel processes to obtain a process-specific sample of N values.

* * * * *